United States Patent [19]

Geller

[11] Patent Number: 5,579,180
[45] Date of Patent: Nov. 26, 1996

[54] PORTABLE LIGHT REFLECTOR

[76] Inventor: Peter Geller, Borsteler Bogen 27, D-22453 Hamburg, Germany

[21] Appl. No.: 136,668

[22] Filed: Oct. 15, 1993

[30] Foreign Application Priority Data

Nov. 11, 1992 [DE] Germany ............................ 9215330 U

[51] Int. Cl.⁶ ........................... G03B 21/56; G02B 5/136
[52] U.S. Cl. ......................... 359/847; 359/443; 359/871
[58] Field of Search .................................. 359/443, 460, 359/461, 846, 847, 849, 553, 871, 538, 838; 248/472

[56] References Cited

U.S. PATENT DOCUMENTS

| | | | |
|---|---|---|---|
| 2,129,154 | 9/1938 | Sherman | 362/355 |
| 2,160,426 | 5/1939 | Archer | 359/553 |
| 2,888,072 | 5/1959 | Nicholas | 160/377 |
| 3,213,925 | 10/1965 | Albee | 160/329 |
| 3,255,725 | 6/1966 | Kreidner et al. | 359/553 |
| 3,942,869 | 3/1976 | Portner et al. | 359/443 |
| 4,017,152 | 4/1977 | Allen | 359/443 |
| 4,110,003 | 8/1978 | Zinn | 359/461 |
| 4,325,197 | 4/1982 | Achten et al. | 40/610 |
| 4,998,189 | 3/1991 | Guggemos | 362/278 |
| 5,174,576 | 12/1992 | Lee et al. | 359/871 |

FOREIGN PATENT DOCUMENTS

| | | | |
|---|---|---|---|
| 531527 | 12/1957 | Belgium | 359/443 |
| 1167367 | 11/1958 | France | |
| 1124516 | 8/1968 | United Kingdom | 359/443 |

Primary Examiner—Paul M. Dzierzynski
Assistant Examiner—John Juba, Jr.
Attorney, Agent, or Firm—Friedrich Kueffner

[57] ABSTRACT

A portable light reflector includes a collapsible frame and a reflecting sheet connected to the frame. The collapsible frame includes two longitudinal struts and transverse stirrups connecting the longitudinal struts. The ends of the transverse stirrups are bent out of a plane defined by the longitudinal struts and the reflecting sheet connected to the longitudinal struts. The angle defined between each end and the connecting piece between the ends of the transverse stirrup is greater than 90°. The reflecting sheet is of spring-elastic material which is tensioned in the position of use of the light reflector.

7 Claims, 2 Drawing Sheets

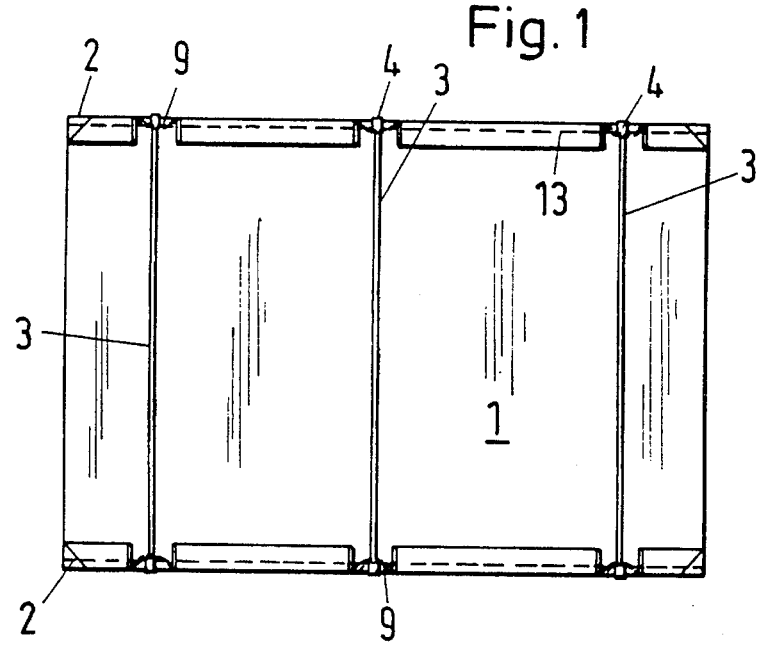
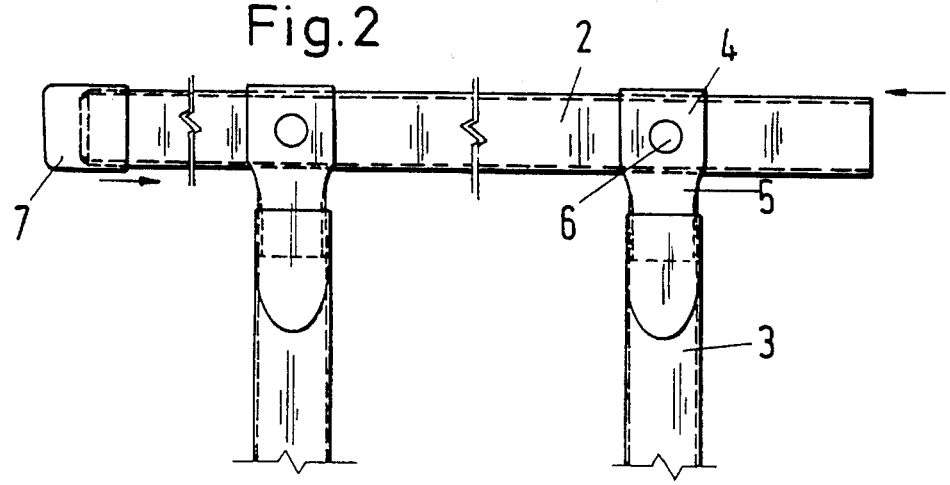
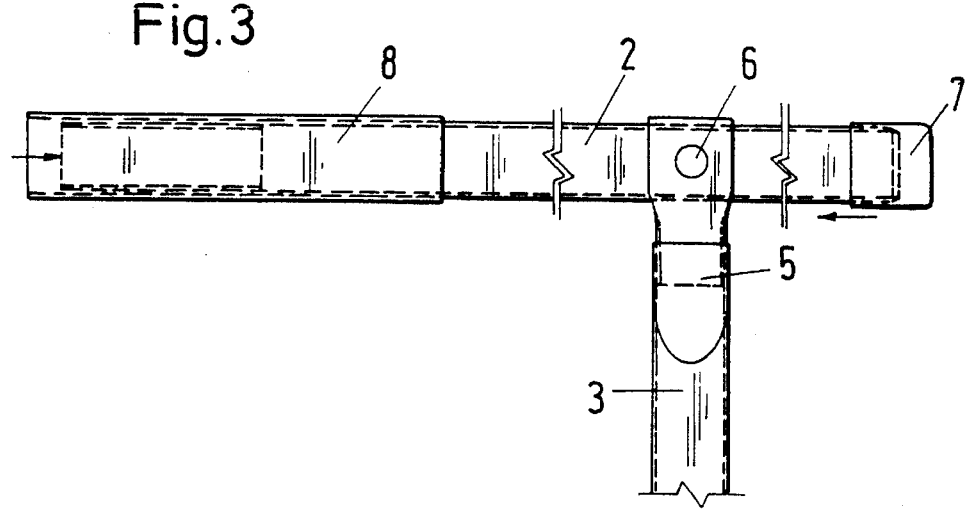

PORTABLE LIGHT REFLECTOR

BACKGROUND OF THE INVENTION

1. Field of the Invention

The present invention relates to a portable light reflector including a collapsible frame and a reflecting cloth or sheet fastened to the frame.

2. Description of the Related Art

Various portable light reflectors of the above-described type are known in the art. They have the purpose to reflect artificial light or daylight and are used for providing additional light during photographic work. The known light reflectors are either rigid or they can be folded up, for example, in the manner of an umbrella, or they are collapsible. Also used are cloths or sheets with metallized surfaces which are mounted on wooden or metal frames.

Light reflectors of this type are required to be constructed in such a way that they can be easily transported, even in airplanes.

SUMMARY OF THE INVENTION

Therefore, it is the primary object of the present invention to provide a portable light reflector of the type described above which, for purposes of transportation, is collapsible as small as possible, while simultaneously being very stable in the position of use, i.e., in the erected or mounted position. In addition, the light reflector should have a low weight.

In accordance with the present invention, the frame of the light reflector is formed by two longitudinal struts and a plurality of transverse stirrups connecting the longitudinal struts. In the position of use of the light reflector, a reflecting cloth or sheet is stretched between the two longitudinal struts. The ends of the transverse stirrups are bent outwardly from a plane defined by the longitudinal struts and the reflecting sheet fastened to the longitudinal struts. Each angle between the respective bent end of the transverse stirrup and the connecting member extending between the bent ends is greater than 90°. The reflecting sheet is of a spring-elastic material which is tensioned when the light reflector is in its position of use.

Thus, the light reflector according to the present invention is constructed in such a way that the lightweight and simple parts of the frame can be joined together to form a three-dimensional framework and are held together by means of the spring tension inherent in the reflecting sheet. The particular shape of the transverse stirrups with their bent ends in combination with the spring tension of the reflecting sheet result in a stable three-dimensional structure when the components are joined together and assume the position of use. For transporting the light reflector, the components can be pulled apart within the spring range of the reflecting sheet and the components can be put together in a package which is relatively long, but very small in the direction perpendicularly to the longitudinal extension.

In accordance with an advantageous feature, the light reflector has two longitudinal struts and three transverse stirrups, wherein it is possible to additionally divide the longitudinal struts. In the erected state, i.e., in the position of use, the light reflector is very stable, even when wind forces act on the light reflector. Any torsional forces are absorbed without difficulties.

The various features of novelty which characterize the invention are pointed out with particularity in the claims annexed to and forming a part of the disclosure. For a better understanding of the invention, its operating advantages, specific objects attained by its use, reference should be had to the drawing and descriptive manner in which there are illustrated and described a preferred embodiment of the invention.

BRIEF DESCRIPTION OF THE DRAWING

In the drawing:

FIG. 1 is a rear elevational view of an embodiment of the light reflector according to the present invention in the erected position;

FIG. 2 shows a detail, on a larger scale, of the upper left-hand portion of the frame of the light reflector of FIG. 1;

FIG. 3 shows a detail, on a larger scale, of the upper right-hand portion of the frame of the light reflector of FIG. 1;

DETAILED DESCRIPTION OF THE PREFERRED EMBODIMENTS

Figure 4:
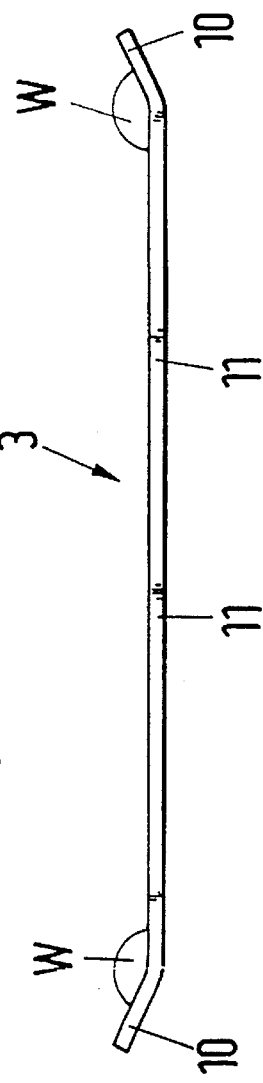
FIG. 4 is a side view of a transverse stirrup with bent ends.
Figure 5:
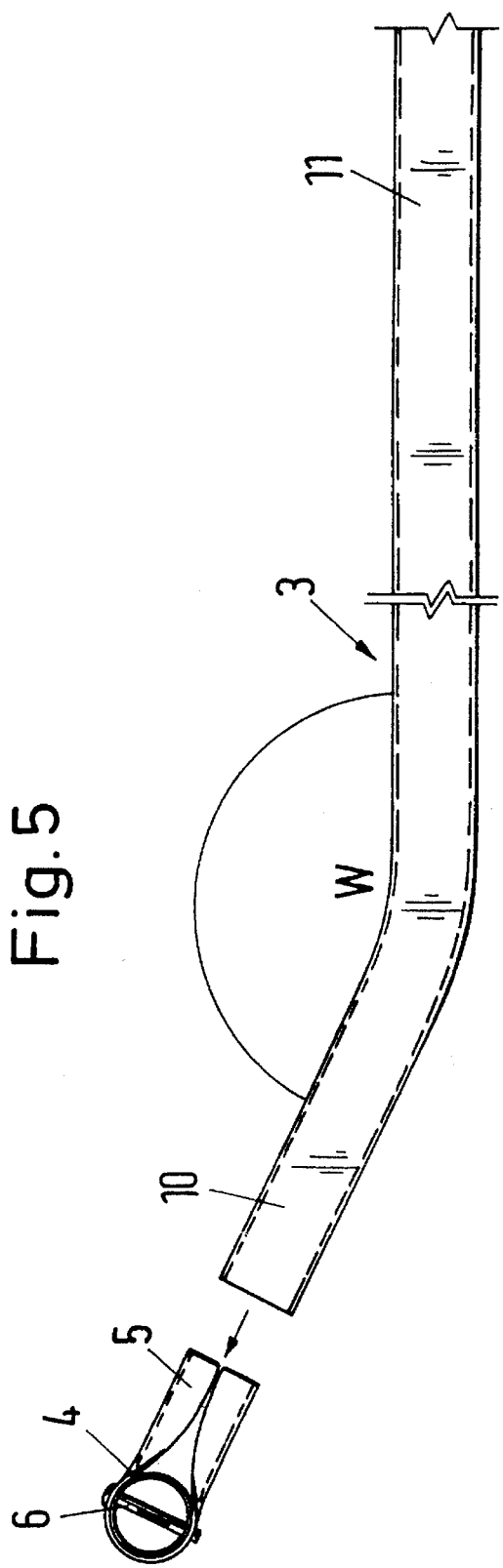
FIG. 5 shows a detail, on a larger scale, of the left portion of the transverse stirrup of FIG. 4.

The light reflector shown in FIG. 1 of the drawing is formed by a frame which is essentially composed of two longitudinal struts 2 and three transverse struts 3. A reflecting sheet 1 is stretched across this frame. The reflecting sheet 1 is composed of a spring-elastic material, i.e., in the stretched state, the spring tension of the sheet 1 becomes effective in order to hold the frame together. In other words, the spring tension of the reflecting sheet 1 prevents loosening of the connections between longitudinal struts and transverse stirrups.

Clamps 4 with pins 5 are fastened by means of rivets 6 to the longitudinal struts 2. The pins 5 fit tightly into the tubes which form the transverse stirrups 3. For protecting the longitudinal stirrups 2 against dirt, caps 7 are placed on the ends of the longitudinal struts 2. The longitudinal struts 2 are divided in order to obtain shorter components for folding the components together in transporting position. The components of the longitudinal struts 2 are connected to each other by means of sleeves 8, as illustrated in FIG. 3.

FIG. 4 of the drawing shows a transverse stirrup 3 of which three are used in the embodiment shown in FIG. 1. The transverse stirrup 3 has ends 10 and a connecting member 11 connecting the ends 10. The ends 10 of the transverse stirrup 3 are bent, as clearly shown in FIG. 4. The ends 10 are bent out of the plane defined by the reflecting sheet 1. As shown in FIG. 4, this plane extends perpendicularly to the plane of the drawing and is located above the transverse stirrup shown in FIG. 4. The angle W by which the ends 10 are bent relative to the connecting member 11 is greater than 90°. In the illustrated embodiment, the angle W is approximately 155°.

By pushing the transverse stirrups 3 onto the pins 5 mounted on the longitudinal struts by means of the clamps 4 and rivets 6, a stable three-dimensional structure is obtained which is held together by the spring tension of the reflecting sheet 1. When the light reflector is assembled, the reflecting sheet is tensioned to a significant extent, so that the ends 10 of the transverse stirrups 3 can be pushed onto the respective pins 5 mounted on the longitudinal struts 2.

After all components have assumed the final position, the spring tension is still maintained.

As is clear from FIG. 1, longitudinal pockets 13 are formed at the long edges of the reflecting sheet 1. The longitudinal struts 2 are insertable into the longitudinal pockets 13. The longitudinal pockets have cutouts in the areas of the clamps 4, so that the longitudinal pockets 13 do not impair the assembly and mounting of the transverse stirrups 3 in these areas.

The angle W which is greater than 90°, together with the spring tension of the reflecting sheet 1, result in a stable and torsion-resistant structure which is very light and can be easily assembled and disassembled. In an embodiment of the light reflector having 2.5 square meters reflecting surface area, the total weight is approximately 2,000 g. In the collapsed state, the entire light reflector fits into a tube having a diameter of about 10 cm and a length of 110 cm. The light reflector does not have any parts required for fastening, such as loose screws or the like, which could become lost. The entire assembly is carried out by pushing the components together. The resulting connections are held together by the natural tension of the reflecting sheet.

Of course, it is also possible to mount the light reflector on a tripod by means of an appropriate adaptor.

The invention is not limited by the embodiments described above which are presented as examples only but can be modified in various ways within the scope of protection defined by the appended patent claims.

I claim:

1. A portable light reflector comprising a collapsible frame and a reflecting sheet fastened to the frame, the collapsible frame comprising two longitudinal struts and at least two transverse stirrups for connecting the longitudinal struts, each transverse stirrup having two end portions and a connecting portion connecting the end portions, the longitudinal struts defining a plane, each end portion of the transverse stirrups extending at an angle relative to the plane, each angle between the end portions and the connecting portion being greater than 90°, wherein the reflecting sheet is of a spring-elastic material which is tensioned when mounted on the longitudinal struts of the frame in a position of use, further comprising pins connected to the longitudinal struts, the end portions of the transverse stirrups being slid onto the pins in the position of use, wherein the pins and the end portions of the transverse stirrups are aligned in axial direction thereof in the position of use and the axial direction is determined by the angle between the end portions and the connecting portion.

2. The light reflector according to claim 1, wherein the transverse stirrups are tubes, wherein the tubes are tightly slidable onto the pins.

3. The light reflector according to claim 1, comprising clamps for fastening the pins to the longitudinal struts.

4. The light reflector according to claim 1, wherein the reflecting sheet has longitudinal edges, the reflecting sheet comprising longitudinal pockets at the longitudinal edges for receiving the longitudinal struts, the longitudinal pockets having cutouts at locations of connection between the transverse stirrups and the longitudinal struts.

5. The light reflector according to claim 1, wherein each longitudinal strut is comprised of two portions, further comprising a sleeve for connecting the two portions of each longitudinal strut.

6. The light reflector according to claim 1, wherein the angle between each end portion and the connecting portion of the transverse stirrup is between 120° and 170°.

7. The light reflector according to claim 6, wherein the angle is 155°.

* * * * *